Sept. 29, 1953 R. W. JENSEN 2,653,797
SUBMERGED VALVE OIL COOLER
Filed Nov. 8, 1948 2 Sheets-Sheet 1

RAYMOND W. JENSEN,
INVENTOR.

BY John H. G. Wallace

RAYMOND W. JENSEN,
INVENTOR.

BY John H. Wallace

Patented Sept. 29, 1953

2,653,797

UNITED STATES PATENT OFFICE 2,653,797

SUBMERGED VALVE OIL COOLER

Raymond W. Jensen, Los Angeles, Calif., assignor to The Garrett Corporation, Los Angeles, Calif., a corporation of California Application November 8, 1948, Serial No. 58,935

3 Claims. (Cl. 257—2)

This invention relates in general to oil cooling and fluid viscosity regulating systems for internal combustion engines and relates, in particular, to an oil cooler or heat exchanger having means encased within its encompassing shell to control and direct the flow of oil therethrough as well as to protect the relatively frail core of the oil cooler from the destructive effects of excessive pressures or pressure surges in the oil circulating system associated therewith.

Oil coolers now generally employed for aircraft installation consist in a cellular type of heat exchanger having an external shell enclosing a plurality of small, thin-walled tubes through which coolant air or other refrigerant is passed. Inlet and outlet openings are provided in the shell which openings are connected in series with the oil circulating system. These oil circulating systems usually employ a scavenging pump which draws oil from the engine sump and forces it on through the necessary conduits and the heat exchanger to the reservoir or tank. Another pump may be provided between the tank and the engine for forced lubrication of the latter. Obviously, the pressures present in such an oil system are varying continuously, subject to the various conditions of operation.

Ordinarily, during the initial starting of the engine for the purpose of conditioning the same preparatory to flight and particularly during low temperature conditions, the lubricant in the various parts of the system is more viscous than is desired for efficient operation. Under such circumstances, high pressure is required to force the more or less congealed lubricant through the system to the vital parts of the engine which require uniform and constant lubrication. It is obvious from the foregoing that a high pressure will be built up immediately on starting the engine which high pressure may result in damage to the system, particularly to the relatively frail construction of the oil cooler.

Under the usual starting conditions, particularly in low temperatures, it is generally considered desirable to bypass the oil cooler, at least partly, in order to raise the temperature of the lubricant so that it may attain its proper working viscosity as soon as possible. To this end, a valve of some sort is provided in the system which may be associated closely, or otherwise, with the oil cooler. Such valves have been provided which are affixed externally to the shell of the oil cooler, and which perform one or more of the functions of protection against inlet surges of pressure, back pressure surges, the bypassing of all or a portion of the oil cooler and other similar control functions.

In connection with such valves, oil coolers have been provided, at times, with an external muff or outer shell which, in conjunction with the said valves, serves to provide a passage for the congealed oil which is not as restricted as the usual passage through the inner core with its maze of tubes and baffles. This muff also serves the purpose of surrounding the heat exchanger proper with oil of increasing warmth which aids in the thawing out of the congealed oil in the spaces adjacent to the coolant tubes. As the oil temperature continues to increase, more of the oil is routed through the cooler proper until finally all of the oil is passing through the inner core and the system is functioning properly.

It will be appreciated that the valves and muffs provided for the foregoing functions have considerably increased the weight and size of the oil cooler units. The primary object, therefore, of my invention is to provide an oil cooler of much smaller external dimensions and weight without sacrifice of oil cooling efficiency.

Another object is to provide a smaller oil cooler having the necessary protective and control functions incorporated in a single valve unit which is submerged within the shell of the oil cooler, thus materially decreasing the overall size of the unit and facilitating its installation in the limited spaces wherein it is needed.

A further object is to provide an oil cooler unit which, due to its submerged valve, is of increased efficiency in promoting a more rapid heating of the oil in the system, thus protecting the engine and its associated apparatus from prolonged exposure to the high pressures attendant upon starting and providing the necessary lubrication in much less time than those systems heretofore used.

A still further object is to provide a single unitary valve which provides all the protective and control functions previously furnished by one or more valves, and which valve unit is easily replaceable in the event of damage or malfunctioning.

Another object of this invention is to provide, in an oil cooler, a single unitary protective and oil flow control device which will be automatically actuated by the various pressures and temperatures present and developed in the oil circulatory system. The oil cooler is thus afforded maximum protection while rapidly and efficiently promoting the proper condition of viscosity in the vital lubricant.

While the oil cooler and submerged valve forming the subject matter of the present invention is herein described as being applied to the lubricant circulating and conditioning system of an aircraft, it is to be understood that the same is not restricted to aircraft alone, but is applicable to power units used in conjunction with all other types of motive vehicles, or to any and all types of fluid circulating systems wherein a similar problem is involved.

The foregoing and other important objects and advantages will be readily apparent in the following detailed description and in the accompanying drawings, which latter are for purposes of illustration only. With reference to the drawings, wherein like reference characters indicate like parts throughout the several views, Fig. 1 is a perspective view of my invention showing the relationship of the various parts of the oil cooler, its tubes, baffles, inlet and outlet, and the position and comparative size of the submerged valve unit.

Figure 1:
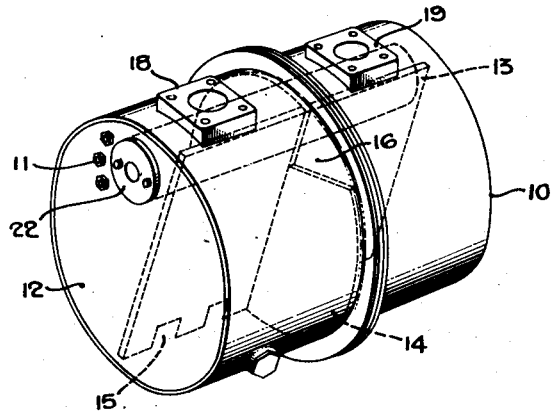

Referring to the drawings, the oil cooler, or heat exchanger portion, comprises a circular, metallic shell 10 enclosing a plurality of thin-walled longitudinal tubes 11 having hexagonal ferrules expanded into the usual header end plates 12. Air or other coolant is passed through these tubes while the oil or fluid to be conditioned flows over and between them in the confines of the shell. Two baffles are provided: a longitudinal baffle 13 and a generally circular transverse baffle 14. Longitudinal baffle 13 possesses cut-out portions 15 in its lower edge for passage of fluid from one side of the cooler to the other while transverse baffle 14 has a half-segmental cut-out portion 16 which provides for circulation of the fluid between the ends of the cooler. These baffles are thus so dimensioned, located, and ported as to divide the cooler core into four sections with the consequent flow of fluids indicated by arrows 17.

The oil or fluid inlet is indicated at shell fitting 18 and the outlet at shell fitting 19. These fittings are secured to the shell by brazing or other suitable means and provide a substantial support for the external conduit connections. It should be noted at this point, as will be described more fully hereinafter, that transverse baffle 14 is so situated with respect to the submerged control valve that the cooler shell is divided into an inlet portion and a bypass and outlet portion. Thus there are three possible paths for the fluid to take between inlet 18 and outlet 19: through the entire core assembly; bypass through the outlet half of the core assembly; or bypass directly through the valve with full protection afforded to the core assembly.

The submerged valve assembly 20 comprises principally tubular housing 21, end plug 22, surge relief valve 23, valve main inlet chamber 24, surge check valve 25, core inlet passage 26, valve inlet bypass 27, bypass valve 28, core bypass passage 29, thermostatic element 30, valve main outlet chamber 31, core outlet check valve 32, core outlet passage 33, end plug 34, thermostatic element adjusting screw 35, and surge relief bypass passages 36.

Removable couplings 37 are provided for connecting the submerged valve assembly to the cooler shell at shell fittings 18 and 19. As will be noted in Fig. 3, these couplings are inserted into the shell fittings under gaskets 38 and extend down into the valve inlet and outlet chambers. Packing 39 is provided for making an oil-tight joint between the coupling and the tubular housing 21. A matching conduit fitting (not shown) is secured by suitable fastenings to the shell fitting which, by pressure on gaskets 38, holds coupling 37 securely in position. Thus, by breaking the conduit connections at 18 and 19, removing couplings 37, and removing end plug 22, the whole valve assembly may be quickly removed to the right for repair or replacement.

Figure 3:
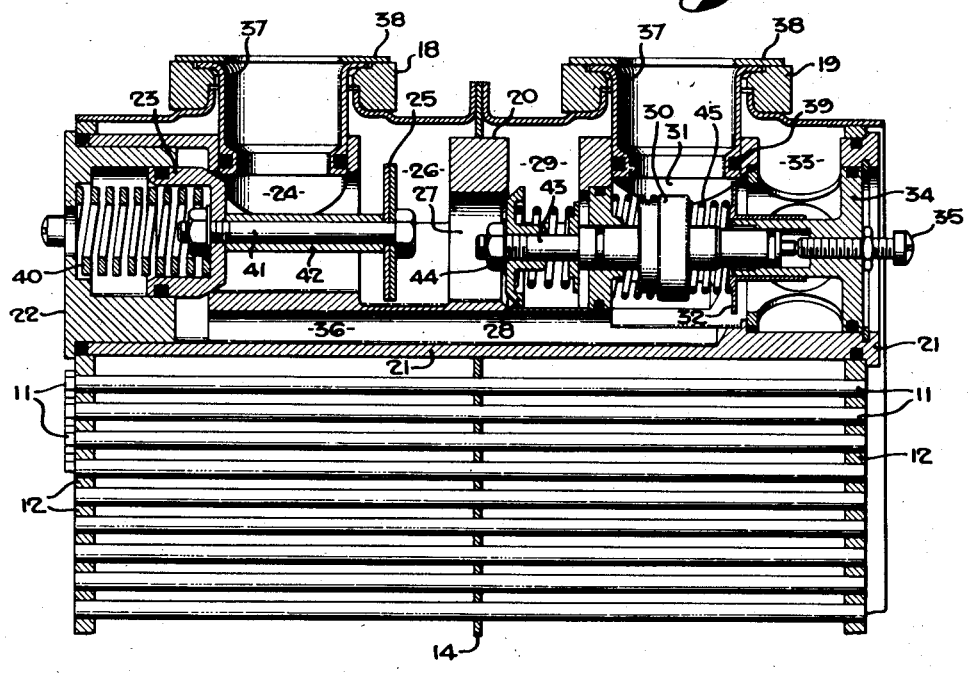
Fig. 3 is a partial vertical section through the oil cooler and submerged valve unit showing the valves in their normal initial position.

Under normal operating conditions when the engine is being started up, the oil in the system is cold, and that in the cooler shell is more or less congealed, the operating positions assumed by the various valve elements are illustrated in Fig. 3. Surge relief valve 23 is held firmly against its seat by compression spring 40. Surge check valve 25 is held open by means of spring 40, surge relief valve 23, and stem 41 which stem, in conjunction with sleeve 42, rigidly connects valves 23 and 25. Thermostat element 30, which is preferably of the "Vernet" or wax-expansion type, is fully contracted and bypass valve 28 is opened by means of stem 43 and nut 44. The oil then flows in through inlet 18 into valve inlet chamber 24, passes surge check valve 25 and enters core inlet passage 26. As the oil in the cooler is congealed, the flow of oil will take the path of least resistance and, instead of leaving the valve assembly through core inlet passage 26, will flow through inlet bypass 27, past valve 28, and out of the valve assembly into the core through core bypass 29. Initially, the flow of oil, due to the congealment present in the cooler core, will occur only adjacent to the exterior surface of housing 21 and will flow therealong into core outlet passage 33. The pressure of the oil will open core outlet check valve 32 against the comparatively light pressure of spring 45, and the oil flow will then proceed past check valve 32 into valve outlet chamber 31 and reenter the circulatory system through outlet 19.

As the engine continues to operate, the oil becomes warmer, gradually thawing out the outlet section of the cooler. Upon reaching a certain temperature, thermostatic element 30 expands, forcing bypass valve 28 to the left by means of abutment washer 46 and spring 48 and thus finally closing off inlet bypass 27. During this process, as the temperature of the oil is increasing and its pressure decreasing, an increasing quantity of oil is caused to flow out through core inlet passage 26 into the inlet section of the cooler. Upon the complete thawing out of this inlet section, bypass valve 28 closes fully and the various valve elements will have assumed the operating positions indicated in Fig. 4.

Figure 2:
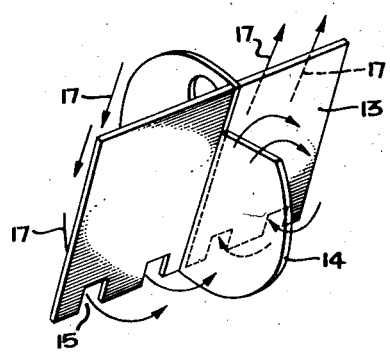
Fig. 2 is a perspective view of the oil cooler baffle arrangement.
Figure 4:
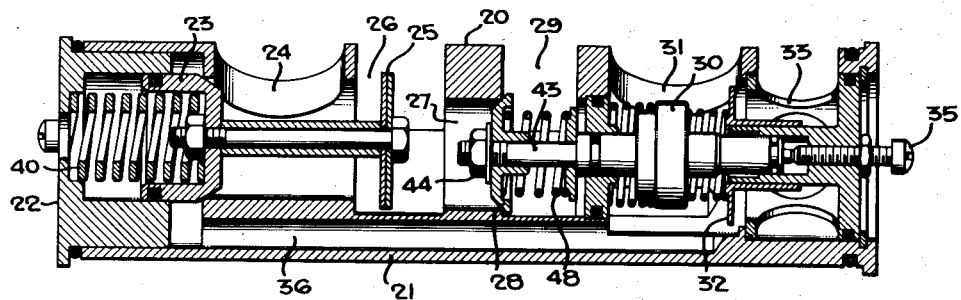
Fig. 4 is a vertical section of the submerged valve unit showing the valves in their normal operating position.

The static condition of operation of the submerged valve shown in Fig. 4 may be considered as that assumed during the normal running conditions. In this case, oil enters inlet 18 and passes successively into core inlet passage 26, the inlet half of the cooler, around the baffles as indicated by the arrows 17 in Fig. 2 and out through core outlet passage 33, past check valve 32, emerging through valve outlet chamber 31 into the conduit attached to outlet fitting 19.

In the event of a sudden congealment of the inlet section of the cooler or other momentary increase in pressure, inlet bypass valve 28, which is axially displaceable on stem 43, may be forced open against the compression of spring 48 which thus allows the oil to flow more directly to the valve outlet. The bypassing of the oil under these conditions affords a means of protection against such momentary increases of pressure regardless of their cause.

It should be understood that while the foregoing description has been directed to what might be termed static conditions, actually the control of flow of oil through the valve assembly and cooler is effected automatically by the thermostatic element and valves responding to the continually varying factors of oil temperature and pressures. As the temperature decreases, for instance, thermostatic element 30 moves to the right, relieving the compressive spring pressure on bypass valve 28 and thus allowing it to more readily open under the usual concomitant of increased pressure. At any moment, the flow of oil through the cooler may be partially through the oil cooler proper and partially through the valve bypass. Thus the oil is maintained in a desired condition of viscosity subject to the temperature and pressure regulation established by the predetermined settings of the various compression springs and the thermostatic element.

The desired operating temperature of the oil may be varied by shifting thermostatic element 30 one way or the other by means of adjusting screw 35. The normal operating pressure through the cooler may be selected by varying the position of nut 44 on bypass valve stem 43 which results in a change in compression of spring 48.

Figure 5:
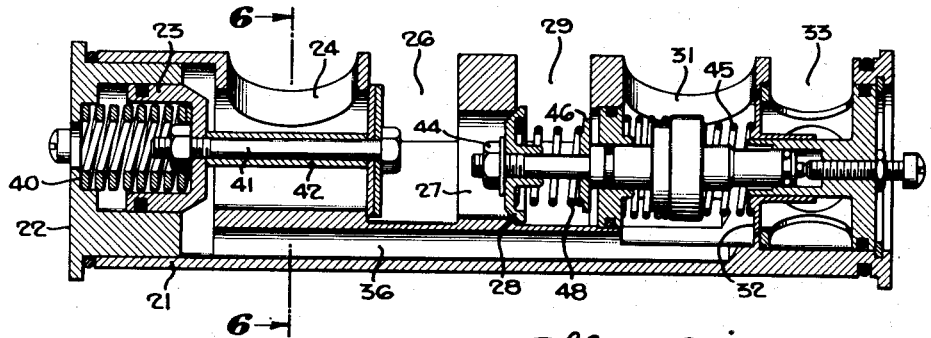
Fig. 5 is a vertical section of the submerged valve unit showing the valves in surge relief position, and, Fig. 6 is a transverse cross section of the submerged valve unit housing taken on the line 6—6 of Fig. 5 and showing the surge relief passages.
Figure 6:
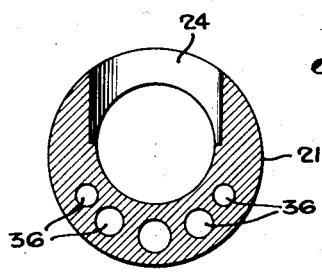

In the event of a sudden congealment of the entire cooler core or a pressure surge of great intensity, spring loaded surge relief valve 23 will be forced to the left against the preset compression of spring 40 thereby opening up surge relief bypass passages 36 to inlet chamber 24 which passages, in turn, communicate directly with valve outlet chamber 31. This condition is depicted in Fig. 5 while the surge relief bypass passages 36 are shown in detail in Fig. 6.

As surge relief valve 23 is forced to the left by the sudden excess pressure, surge check valve 25 is constrained to follow. This action occurs due to the predetermined relationship of the effective pressure areas of the two valves, the lesser area being represented by valve 25 at the instant of closing off the passage between inlet chamber 24 and core inlet passage 26. Prior to the point of closing, the pressures on either side of surge check valve 25 are equalized and hence present no impediment to the movement of surge relief valve 23. In moving to the left, check valve 25 closes the passage between inlet chamber 24 and core inlet passage 26 thus sealing off the remainder of the valve structure from any flow of oil either through the valve assembly or the oil cooler core except, of course, for the flow of oil through the surge relief passages 36 and the outlet chamber 31. The flow of oil through the cooler having stopped, core outlet check valve 32 is forced against its seat by the combined effects of spring 45 and the surge pressure in outlet chamber 31 thus preventing any reverse flow of oil through the cooler core and protecting it from damage by the excess pressure.

Having thus described my invention of a submerged valve oil or fluid cooler and shown a preferred example thereof, it should be understood that various changes in the shape, size, arrangements of parts, and types of fluid or coolant used may be resorted to without departing from the spirit of the invention, I claim:

1. A viscosity regulator for congealable fluid under varying pressure and temperature comprising: a heat exchanger having a metallic shell, a fluid inlet and outlet in said shell, a core structure consisting of a plurality of thin-walled tubes for the passage of coolant therethrough and a pair of baffles for directing the fluid flow over and around said tubes, a pair of perforated end plates in said shell supporting said tubes; and a cylindrical temperature and pressure responsive control means removably supported by said end plates within said shell, said control means having a fluid inlet and outlet; removable inserts between said shell inlet and outlet and said control means inlet and outlet; and a removable connection between one end of said control means and an end plate of said heat exchanger whereby upon removing said inserts and connection, the control means can be bodily removed from said heat exchanger without disturbing the core structure.

2. A fluid flow control mechanism for removable insertion into a heat exchange unit having a fluid inlet, a fluid outlet, and a core, said mechanism comprising: a tubular housing; inlet and outlet chambers in said housing communicating with said heat exchange unit inlet and outlet; a core inlet passage leading from said inlet chamber through the wall of said housing to said core; a by-pass passage leading from said core inlet passage to a core by-pass chamber in said housing; an opening through the wall of said housing leading from said by-pass chamber to another section of said core; a thermostatic element in said outlet chamber; valve means actuated by said thermostatic element to close said by-pass passage when the temperature of the fluid in said outlet chamber has reached a predetermined degree; a series of longitudinal passages in the wall of said tubular housing connecting said inlet and outlet chambers; and a spring-loaded pressure responsive valve structure for simultaneously opening said wall passages to said inlet chamber and closing off said core inlet passage from said inlet chamber, whereby, upon exceeding a predetermined maximum pressure, the fluid is protectively by-passed wholly through the control mechanism.

3. The fluid flow control mechanism defined in claim 2, further characterized by a core outlet passage in one end of said tubular housing leading from said core to said housing outlet chamber, and a check valve between said core outlet passage and said housing outlet chamber for closing off said core outlet passage when the pressure in said housing outlet chamber exceeds the pressure in said core outlet passage, whereby reverse flow fluid through the heat exchange unit is prevented.

RAYMOND W. JENSEN.

References Cited in the file of this patent

UNITED STATES PATENTS

| Number | Name | Date |
|---|---|---|
| 1,764,200 | Dean | July 17, 1930 |
| 2,071,106 | Blair | Feb. 16, 1937 |
| 2,223,662 | Lear | Dec. 3, 1940 |
| 2,288,599 | Ramsaur | July 7, 1942 |
| 2,344,207 | Hannon | Mar. 14, 1944 |
| 2,458,547 | Worth | Jan. 11, 1949 |
| 2,468,519 | Shaw | Apr. 26, 1949 |
| 2,469,212 | Shaw | May 3, 1949 |
| 2,470,667 | Warrick | May 17, 1949 |

FOREIGN PATENTS

| Number | Country | Date |
|---|---|---|
| 460,047 | Great Britain | Jan. 20, 1937 |